United States Patent [19]

Fier, Jr.

[11] 3,712,270
[45] Jan. 23, 1973

[54] CHICK FEEDER LID STRUCTURES

[76] Inventor: Edward J. Fier, Jr., 572 Killarney Pass, Mundelein, Ill. 60060

[73] Assignee: United States Steel Corporation

[22] Filed: Dec. 31, 1970

[21] Appl. No.: 103,082

[52] U.S. Cl. .................................. 119/61, 119/18
[51] Int. Cl. ........................................ A01k 39/00
[58] Field of Search .............. 119/15, 18, 19, 61, 51; 229/31

[56] References Cited

UNITED STATES PATENTS

| 3,326,186 | 6/1967 | Doll | 119/19 |
| 3,122,127 | 2/1964 | Shechmeister et al. | 119/18 |
| 3,129,692 | 4/1964 | Sanderson | 119/15 |
| 2,134,051 | 10/1938 | Kirby | 229/31 |
| 3,381,663 | 5/1968 | Dayton | 119/15 |

Primary Examiner—Aldrich F. Medbery
Attorney—John R. Pegan and John E. Callaghan

[57] ABSTRACT

A feeder lid for chicks is provided in the form of a deep dish having ribs throughout its bottom.

5 Claims, 3 Drawing Figures

PATENTED JAN 23 1973 3,712,270

INVENTOR
EDWARD J. FIER JR.
By John E. Callaghan
Attorney

CHICK FEEDER LID STRUCTURES

Feeding baby chicks requires economic, sturdy and reliable feeding lids, as is known in the art as shown by U.S. Pat. No. 3,015,307. There are problems of spillage when the chicks are feeding, efficient use of feeding area, sanitation from accumulated residues, safety of the chicks as they feed, efficient storage when the lids are not in use, minimum set up time to prepare the lids for feeding, and product life time of the lids.

It is among the objects of this invention to provide a chick feeder lid that maintains all the chicken feed within the lid area, that gives efficient use of the feeding area, that is durable, and self-supporting, that minimizes danger to chicks as they feed, that resists the action of moisture and scratching during repeated use, that is washable, and is stackable for shipment or storage. A further object is to provide a feeder lid which either by itself or in combination with a container may be used as a chick feeder.

These and other objects of the invention are obtained by a feeder lid with an outer retaining portion and having a plurality of intersecting ribs forming feeding spaces in the bottom of said lid.

The chick feeder lid may be made of a suitable non-water absorbing material; thermoplastic resins such as low density polyethylene are especially desirable. The intersecting ribs in the bottom of the feeder lid serve two functions: they provide structural reinforcement for the overall lid and they contain the feed within the feeding areas present in the lid bottom. In a preferred embodiment there are both major and minor ribs, both sets of ribs provide these functions. In addition, the minor ribs provide dams against which the feed will collect, the feed lakes thus formed provide a supply from which the chicks may eat; they also prevent the chicks from slipping, overall this increases feeding efficiency.

The overall dimensions of the feeder lid are such that the lid may be supported in standard containers such as egg cartons. Although rectangular shapes are preferred, circles, squares, triangles or hexagons may be used.

Figure 1:
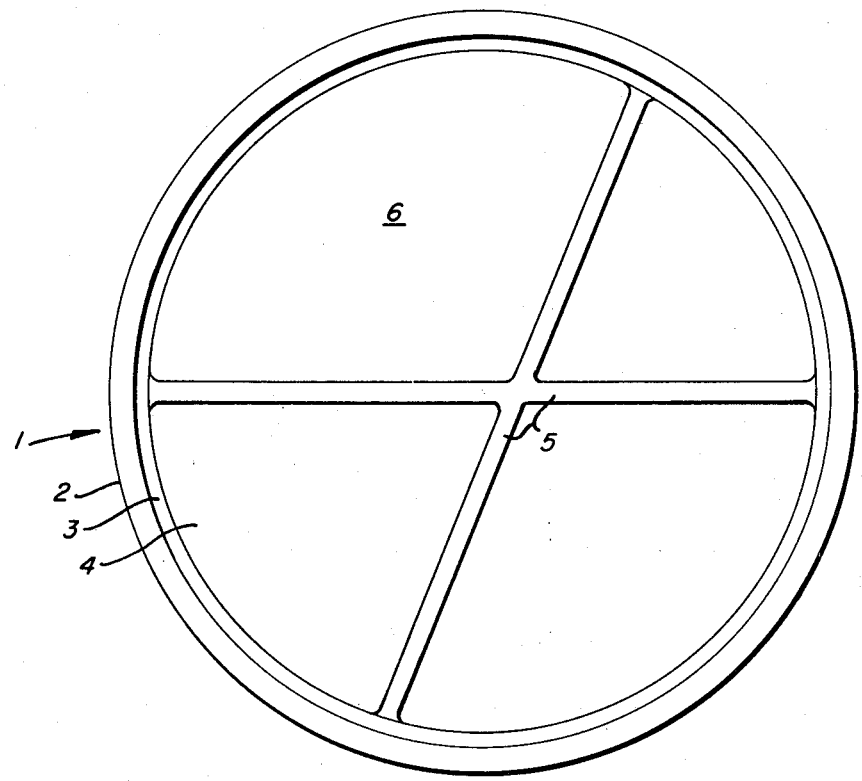
FIG. 1 is a plane view of a ribbed feeder lid within the scope of the invention.

FIG. 1 is a plane view of a feeder lid 1 having an outer retaining portion defined by an edge 2 and a sidewall 3. The edge 2 may be in the form of a straight lip, a curved lip or a downwardly extending outer wall; its purpose is to provide a support area if the lid is to be suspended in another container as well as to act as the outer portion of the lid. The sidewall 3 is of sufficient height to prevent chicks from falling off the lid. Bottom 4 has ribs 5 contained in it. The ribs 5 may be straight such as chords or diameters or they may be curved such as concave or convex arcs. The ribs intersect with each other and with the sidewall to provide a defined area for feeding 6.

Figure 2:
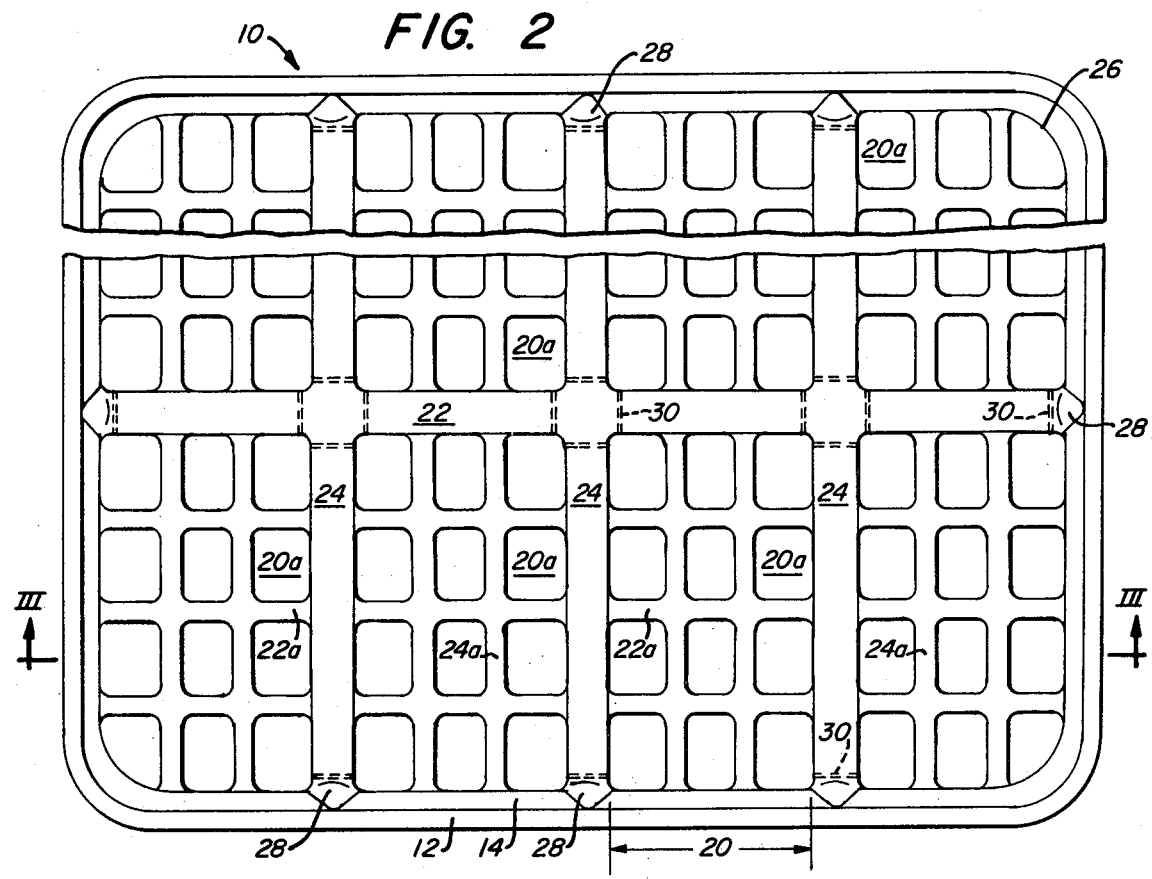
FIGS. 2 and 3 are views of a preferred feeder lid structure of the invention having major and minor ribs.

FIG. 2 illustrates a sectioned plane view of the preferred feeder lid in which there are both major and minor ribs. Feeder lid 10 has an outer edge 12. This edge may be a lip with a short horizontal extension or a short convex extension or it may be an outer wall extended downwardly. Sidewalls 14 and 16 taper downwardly and inwardly from 12 to the bottom 18. By the intersections of major ribs, shown as 22 and 24, with each other and with the sidewalls, bottom 18 is divided into a plurality of defined areas 20. At the intersections of major ribs and sidewalls, tapering ribs 28 are formed. Where the major ribs intersect each other or the sidewalls, on the underside of 18 across the arch of the intersection, strengthening members 30 are provided. These members resemble flashing and provide flexural strength to the arch, therefore to the entire lid. As shown, the defined areas 20 may have rounded corners 26.

Each defined area 20 is further divided into smaller defined areas 20a by the intersections of minor ribs, shown as 22a and 24a, with themselves, the major ribs and/or the sidewalls. The multiplicity of minor ribs provides structural strength in the smaller defined areas 20a, thus co-acting with the major ribs to provide a strong lid. Overall, the lid may be about 14.5 inches wide, 22 inches long and 2 inches in height; this then will fit into conventional cartons as more fully described in FIG. 3.

Figure 3:
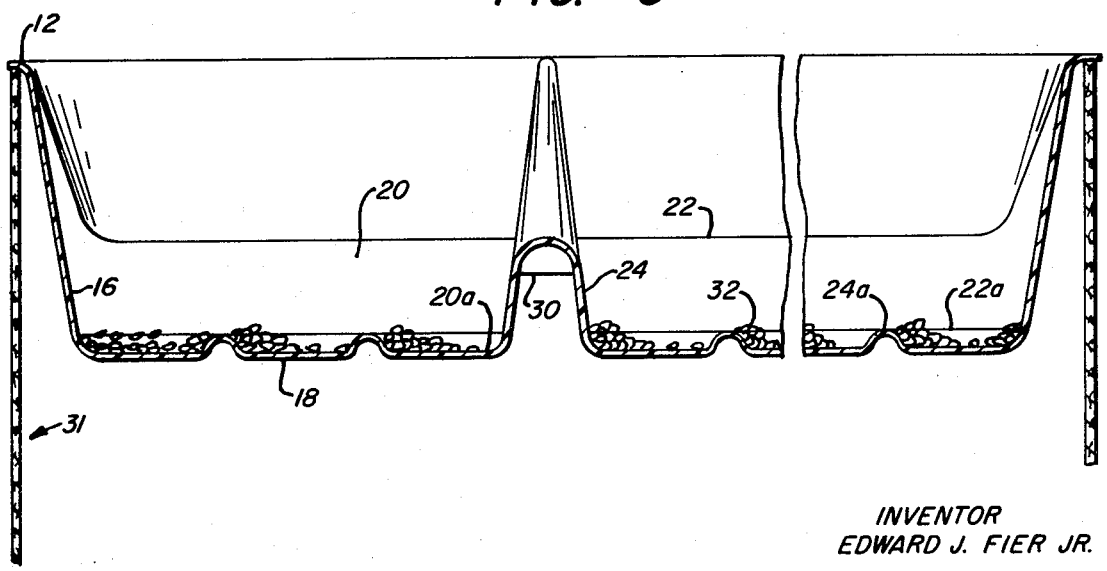

FIG. 3 is an elevational view in cross section taken along line III—III of the feeder lid of FIG. 2 in combination with a container 31, such as a cardboard carton. Container 31 engages the feeder lid along the outer edge 12, thus permitting the lid to be elevated from the ground. In combination, the sidewalls 14 and 16, tapering ribs 28, major ribs 22 and 24, minor ribs 22a and 24a provide a self supporting lid 10 suspended within the container 31. Strengthening members 30 add flexural strength for the arches they span. Sidewall 16 will prevent chicks from falling out of or off the feeder lid, a convenient height is about 2 inches. In the bottom 18, major ribs 22 and 24 will keep the feed within the defined areas 20 without being an obstacle to movement of the chicks between adjacent defined areas. If the lid should be tilted, feed will be kept within the defined area 20 by the major ribs, these ribs may be about three-fourths inches in height. Minor ribs 22a and 24 a form smaller defined areas 20a. When the chicks feed, these minor ribs prevent the flow of chicken feed 32 out of the defined areas 20 and out of the lid itself. Moreover, these minor ribs prevent the chicks from slipping. The minor ribs may be about one-eighth inch in height, while the smaller defined areas may be about ⅞ by 1 3/16 inches.

Usable feeding area in the bottom of the lid is greatly enhanced by the practice of this invention. Especially in the preferred embodiment, major ribs are kept to a minimum by the strength provided in the smaller defined areas with the minor ribs, which will give a major proportion of feeding area in the lid bottom.

As show, the parts of the lid are so shaped and proportioned that several lids may be stacked together for storage. Symmetrical design of the feeder lid lends itself to this stacking. Both major and minor ribs have smooth arcuate tops, this prevents injury to the chicks when they come into contact with the ribs.

Although the invention has been described by reference to specific illustrations, it is intended to include these and other equivalent modifications of form, proportions and materials within the scope of the invention.

I claim:

1. A washable liquid impervious, self supportable chick feeder lid having;

a. an outer retaining portion for retaining chicks within said lid,
b. a bottom portion defining with said outer retaining portion a chick retaining zone,
c. a plurality of ribs in said bottom portion intersecting each other and the outer retaining portion to define feeding areas, said ribs being of a height sufficient to retain feed within said feeding areas without preventing movement of chicks between said defined areas, said ribs including major ribs intersecting in said bottom portion to form defined chicken segregating areas, and minor ribs intersecting within said defined areas to form smaller defined areas, said minor ribs being a means to prevent chicks from slipping and to retain feed within said smaller defined area, and said outer retaining portion and bottom portion and ribs being so shaped and proportioned to permit stacking of said lid with similar lids.

2. The chick feeder lid of claim 1 wherein said outer retaining portion has a lip for mounting said lid within a supporting structure.

3. The chick feeder lid of claim 1 wherein at the rib intersections there is provided flexural strengthening members across the concave arches of said intersections.

4. The chick feeder lid of claim 1 in combination with a support that engages said lid at the periphery thereof.

5. The chick feeder lid of claim 4 in combination with a support that engages said lid at the periphery thereof.

* * * * *